Nov. 13, 1934.　　A. J. SAFORCADA　　1,980,832
AIR SUSPENSION AND SHOCK ABSORBER
Filed Sept. 17, 1932　　5 Sheets-Sheet 1
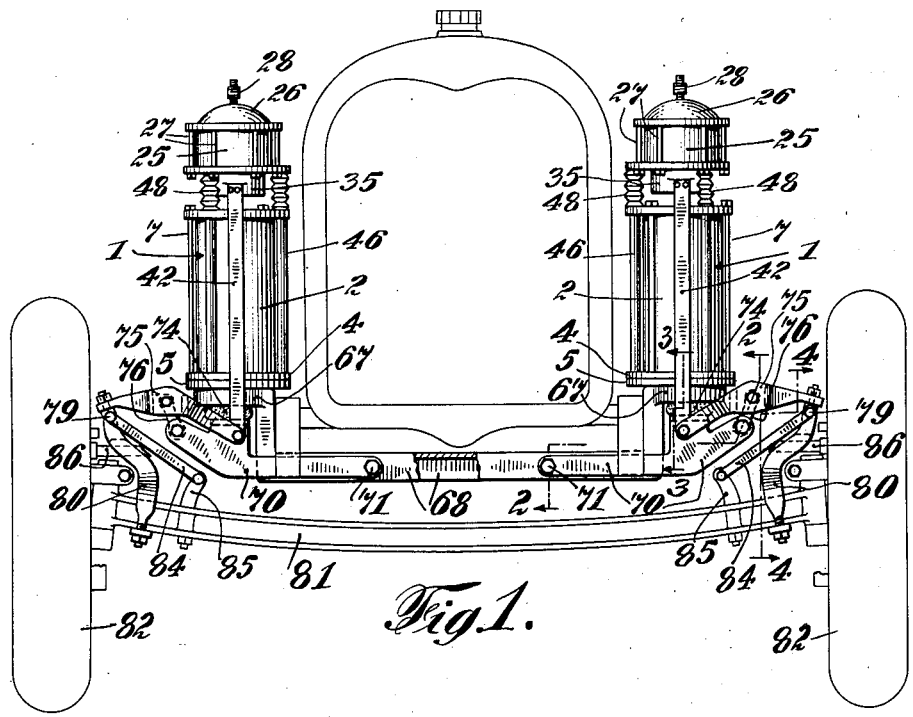
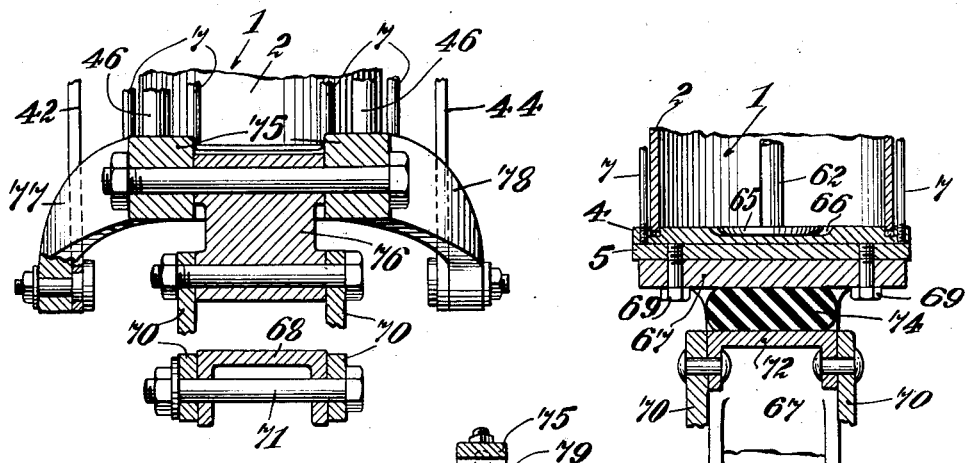
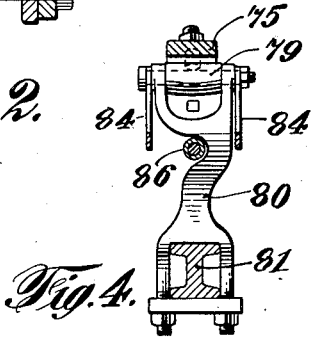
INVENTOR-
Anibal J. Saforcada
BY
Ramsey & Kent
his ATTORNEYS

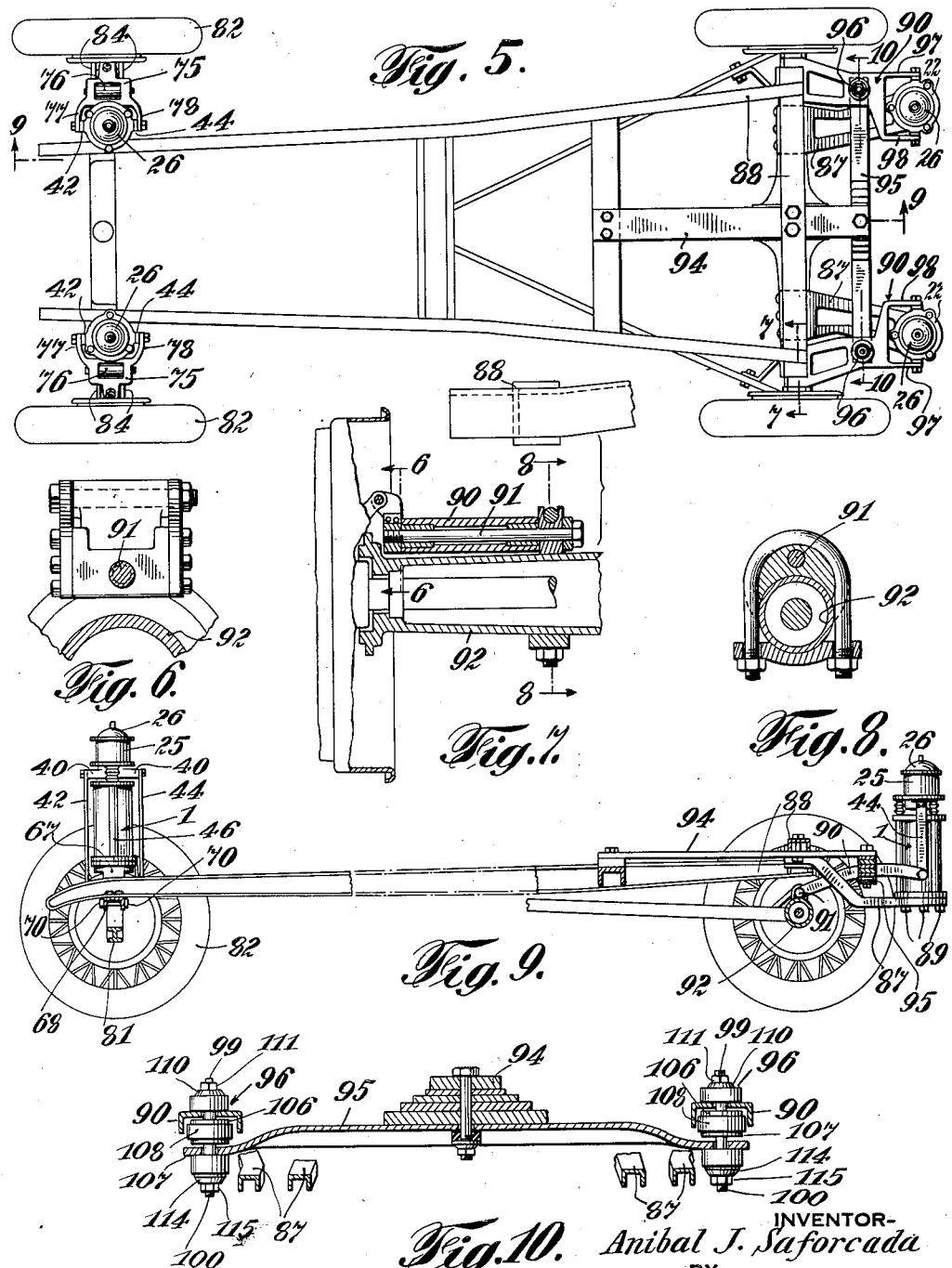

Nov. 13, 1934.  A. J. SAFORCADA  1,980,832
AIR SUSPENSION AND SHOCK ABSORBER
Filed Sept. 17, 1932  5 Sheets-Sheet 4

INVENTOR-
Anibal J. Saforcada
BY Ramsay & Kent
his ATTORNEYS

Nov. 13, 1934.  A. J. SAFORCADA  1,980,832
AIR SUSPENSION AND SHOCK ABSORBER
Filed Sept. 17, 1932   5 Sheets-Sheet 5

INVENTOR-
Anibal J. Saforcada
BY
Ramsay & Kent
his ATTORNEYS

Patented Nov. 13, 1934

1,980,832

UNITED STATES PATENT OFFICE 1,980,832

AIR SUSPENSION AND SHOCK ABSORBER

Anibal J. Saforcada, Martinez, Argentina

Application September 17, 1932, Serial No. 633,571

14 Claims. (Cl. 267—65)

The present invention relates broadly to suspension means for automobiles or other carriages, or vehicles. More especially to an air suspension and shock absorber for use in an automobile structure.

The present invention contemplates the utilization of a constant volume of fluid, for example compressed air, to support the suspended load of an automobile in such manner that shocks are absorbed by super-compressing a portion of the confined compressed air, and permitting a controlled flow of the super-compressed air into a container in communication with the load sustaining volume of air. The use of the word "automobile" is generic in that it is intended to apply to all vehicles with which the present invention may be used.

The present invention further contemplates the provision of sealed containers adapted to sustain fluid under pressure and with movable parts adapted to super-compress the fluid in a part of the system, and to permit a controlled flow of the super-compressed fluid into another part of the system from which controlled return flow occurs to stabilize the pressure in the system.

The device may be embodied in various forms, one of which may comprise a closed cylinder in which is mounted a loose fitting piston hermetically sealed to a sylphon-bellows, which in turn is hermetically sealed to the upper end of the cylinder. The piston is carried upon a hollow piston rod extending through the center of the sylphon and leading to a control chamber which is also hermetically sealed. The passageway from the hollow piston rod is under control of a check valve and a bleeder opening, preferably in the stem of the check valve, communicating from the auxiliary chamber through the hollow piston rod to the space beneath the piston. A control member, comprising a hollow slotted stem mounted in the bottom of the cylinder and extending into the hollow piston shaft, forms a controlled communication passageway for the compressed fluid from beneath the piston. This slot terminates a substantial distance above the bottom of the cylinder, so that when the piston descends below the bottom of the slot the fluid, preferably compressed air, in the lower part of the cylinder is trapped and cut off from flow into and through the hollow piston rod. Suitable guides independent of the piston rod and piston are provided to permit a relative movement between the piston rod, the piston, and the cylinder. The suspended weight of the vehicle is carried on the hollow piston rod. In the operation of the device, the suspended load of the automobile is supported by the compressed fluid acting to raise the piston. The compressed fluid in the cylinder fills the space beneath the piston and also the space around the outside of the sylphon-bellows. The interior of the sylphon-bellows is in free communication with atmosphere around the upper portion of the hollow piston rod. The compressed air in the cylinder also flows through the slot in the control member and through the bleeder opening into the control chamber, so that the entire system is normally under a substantial uniform pressure. The pressure sustaining the load is effective on an area of the piston equal to the external diameter of the necks between the sylphon members plus the action of the pressure on the outside of the sylphon tending to collapse the individual sylphon folds, since the inside of the sylphon is under atmospheric pressure only. When the vehicle is moving and shocks occur to the under-frame, the hollow piston rod moves downwardly carrying the piston downward and compressing the air beneath the piston. This compressed air escapes around the edge of the piston into the sylphon bellows chamber and also through such part of the slot in the control member as is open to the control chamber. A severe shock will super-compress the air beneath the piston so as to lift the check valve in the control chamber, and a part of the super-compressed air flows into the control chamber, raising the pressure therein. If the shock is sufficient to carry the piston below the lower end of the slot in the control member, the air beneath the piston is trapped and rapidly increases in pressure as the piston descends. Upon a rebound, the super-compressed air above the piston around the sylphon resists the upward movement of the piston, and the air beneath the piston becomes reduced in pressure. The back flow of super-compressed air from the control chamber is checked by the check valve, but the bleeder, opening operates to permit the super-compressed air in the control chamber to slowly flow back beneath the piston so as to permit the pressure in the system to equalize. The action of the device, therefore, is to check the rebound and to cause the load to gradually assume normal relative to the running-gear of the vehicle.

Other and further objects of the invention will in part be obvious and will in part be later herein pointed out by reference to the accompanying drawings forming a part hereof.

It is realized that the present invention may be embodied in structures other than those specifically herewith disclosed, and therefore, the disclosure is to be understood as illustrative and not in the limiting sense.

Fig. 1 is a view showing a front elevation of the device as applied to an automobile.

Fig. 2 is a view of a section taken on line 2—2 of Fig. 1 illustrating the portion of the mounting of the device.

Fig. 3 is a view of a section taken on line 3—3 of Fig. 1, illustrating a further portion of the mounting.

Fig. 4 is a view of a section taken on line 4—4 of Fig. 1, illustrating one of the brackets supporting the device.

Fig. 5 is a plan view of a chassis of an automobile with the present invention applied thereto.

Fig. 6 is a view of a section on line 6—6 of Fig. 7.

Fig. 7 is a view of a section on line 7—7 of Fig. 5.

Fig. 8 is a view of a section on line 8—8 of Fig. 7.

Fig. 9 is an elevational view showing a section of chassis in accordance with a chassis of an automobile, in accordance with the present invention on line 9—9 of Fig. 5.

Fig. 10 is a view of a section on line 10—10 of Fig. 5.

Figure 11:
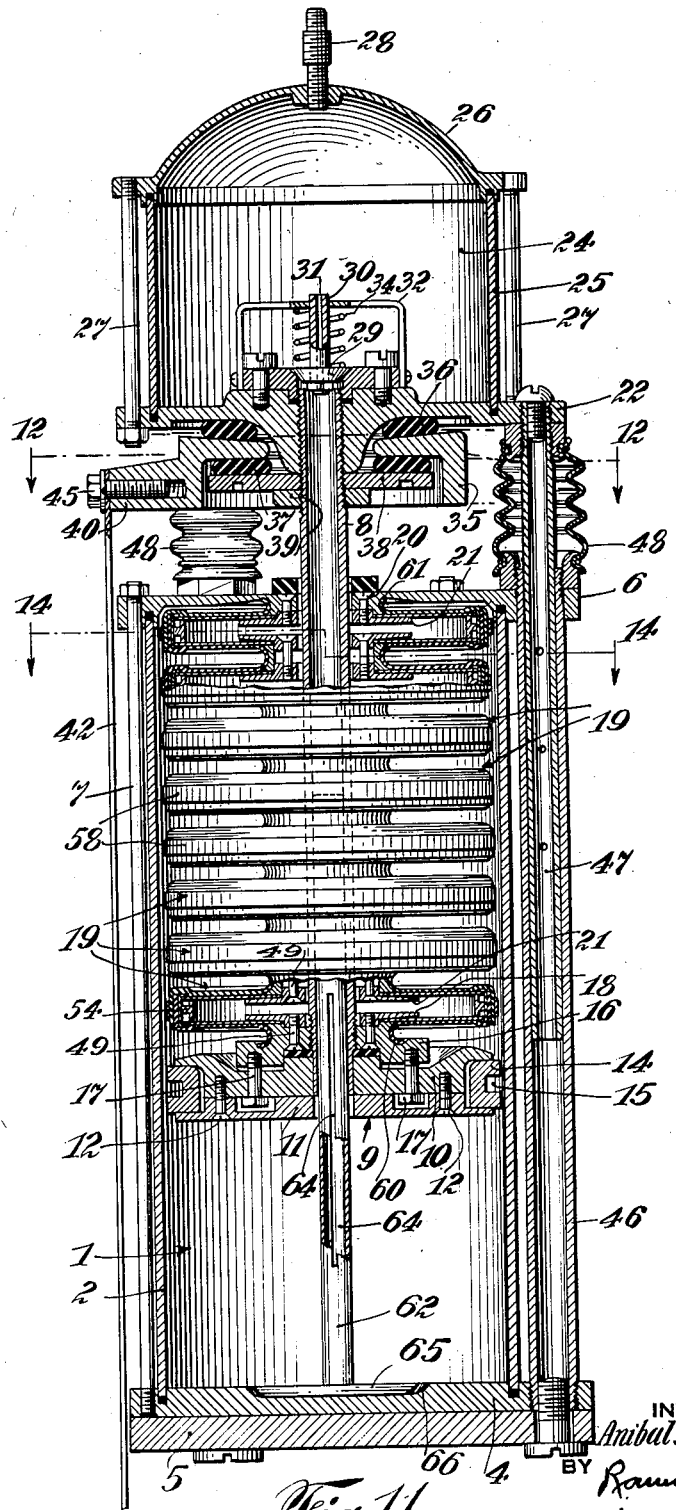
Fig. 11 is a view of a vertical section through one of the air chambers taken on line 11—11 of Fig. 12.
Figure 12:
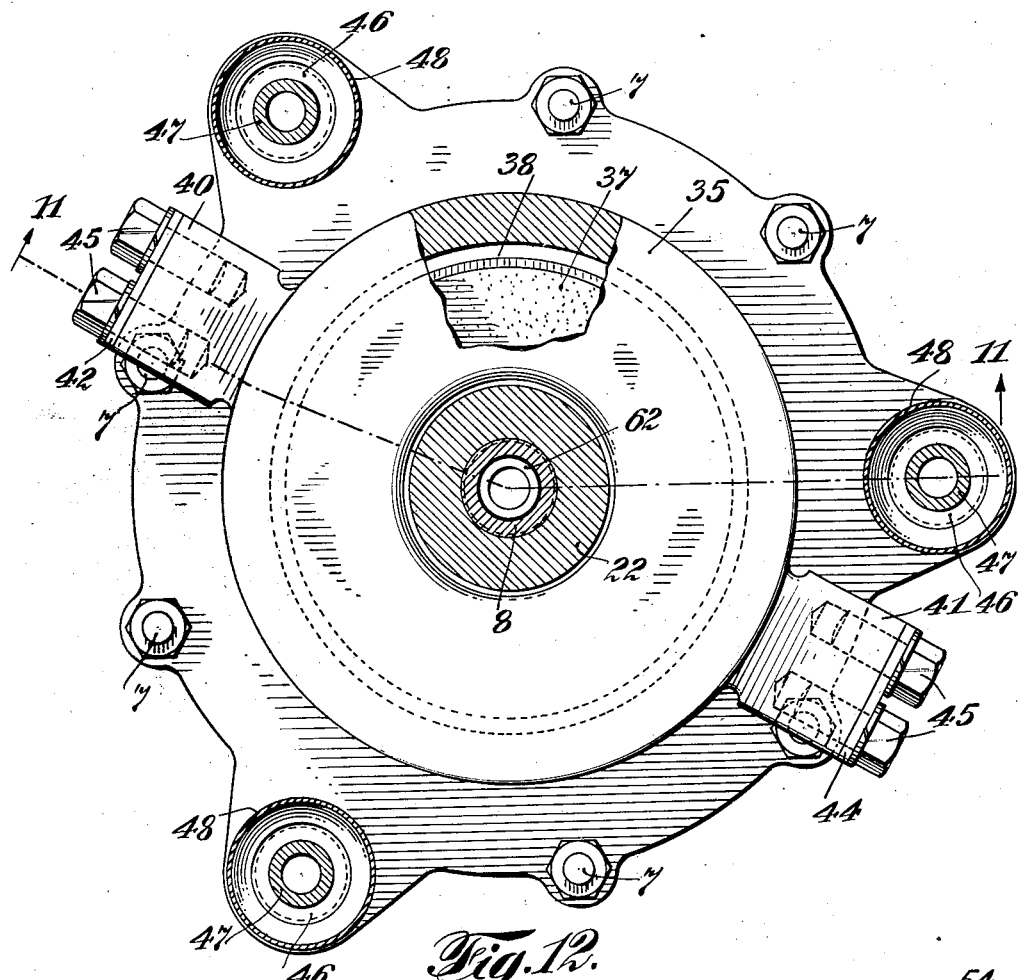
Fig. 12 is a horizontal sectional view taken on line 12—12 of Fig. 11.
Figure 14:
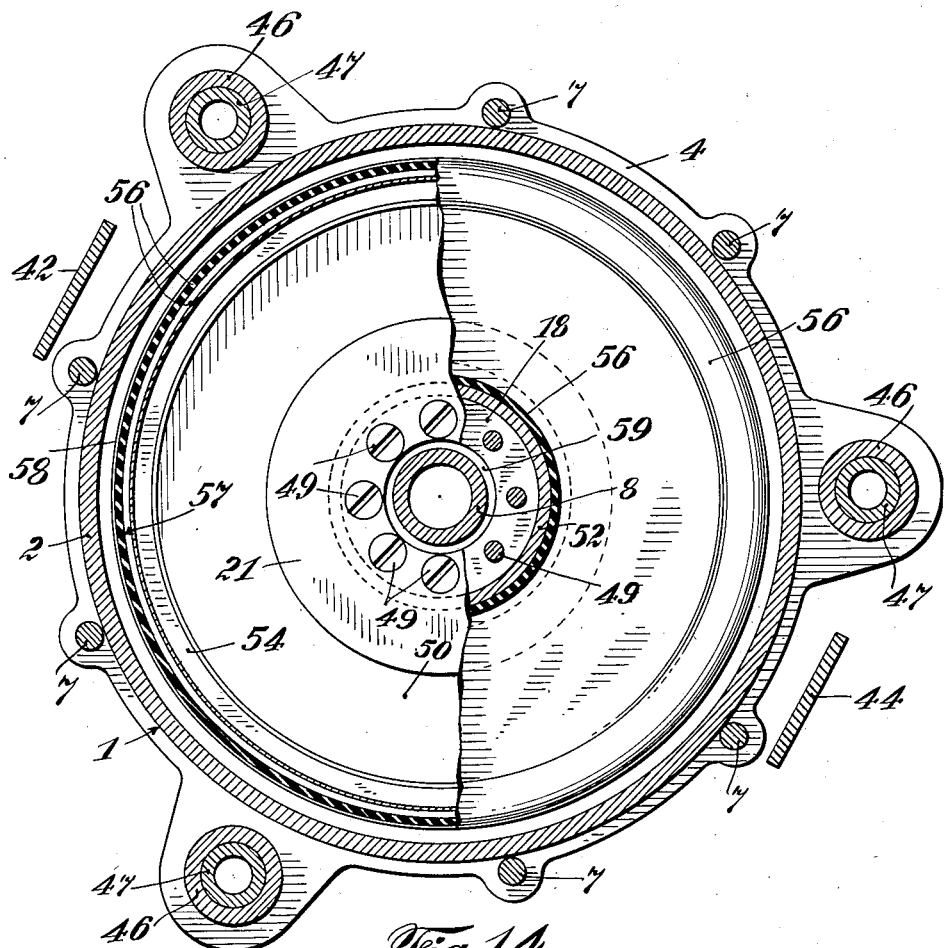
Fig. 14 is a horizontal sectional view on line 14—14 of Fig. 11.

Referring now to the drawings and more especially to Figs. 11, 12, and 14, a main cylinder 1, comprises a cylindrical side wall 2, mounted in a base 4, with lower edges of the side wall 2 hermetically sealed by rubber gaskets, or otherwise, to the base 4. A sub-base 5 is provided as a support for the base 4. The upper end of the side wall 2 is hermetically sealed by rubber or otherwise, with a top 6 of the cylinder. Compression bolts 7 secure the base 4 and the top 6 to the side walls 2, and compress the gaskets at the ends of the side walls in order to form a securely sealed cylindrical chamber. A hollow piston rod 8 extends freely through the top 6 in such manner that atmosphere may freely flow around the sides of the piston rod. This piston rod carries at its lower end a piston 9 which is made up of plates 10 and 11 securely fastened together by screws 12 to enclose a piston ring 14. This piston ring 14 is spaced slightly from the inner surface of the cylindrical side wall 2, to provide a narrow passageway around the piston. Preferably, the piston ring 14 is provided with an annular groove 15 which produces a slight baffle chamber to slightly retard passage of air passing the piston ring 14, and the groove 15 becomes especially effective when high pressure is generated on either side of the piston 9. The plate 10 of the piston 9 is rigidly secured to a collar 16 by means of bolts 17. Suitable gasket material, such as a plate of rubber, is secured between the collar 16 and the piston plate 10 in order to hermetically seal the joint between the piston 9 and the hollow piston rod 8. The collar 16 is rigidly secured to an internal collar 18 forming a part of the lower member of the sylphon 19. The upper end of the sylphon member 19 is anchored to the top 6 of the cylinder by machine screws 20 passing through the top 6, and being secured to an internal collar 21, similar to the internal collar 18.

The upper end of the hollow piston rod 8 is hermetically sealed to the bottom plate 22 of a control chamber 24, comprising cylindrical side walls 25, sealed by suitable rubber gaskets or otherwise, to the bottom plate 22 and with the upper end of the cylindrical side walls 25 being likewise hermetically sealed to a dome 26, forming the upper part of the control chamber. Compression rods 27 securely anchor the dome 26 to the bottom plate 22 of the control chamber and insure hermetical seals at the top and bottom of the cylindrical side walls 25. The dome 26 is provided with an air inlet valve 28, of the type commonly used on high pressure pneumatic tires, whereby air may be introduced, or when desired released, from the system.

A control valve comprising a valve head 29 and a stem 30, is mounted directly over the hollow piston rod 8 to operate as a oneway valve or check valve. This control valve preferably is provided with a bleeder opening 31 in the stem 30. A suitable spider or guide frame 32 around the upper end of the stem 30 guides the control valve which is normally seated by spring 34.

A circular cross head 35 is mounted on the hollow piston rod, preferably between resilient rubber rings 36 and 37, which are compressed by a suspension nut 38, held in place on the hollow piston rod 8 by a lock nut 39. The circular cross head is provided with arms 40 and 41 to which are attached suspension straps 42 and 44 by means of stub bolts 45. These suspension straps extend downwardly past the main cylinder 1 and are connected with a suspension lever system, which will be described later. Preferably, suitable guides are provided to guide the parts during telescoping movements, and these guides may comprise guide pipes 46 securely anchored to the base 4 and to the top 6 of the main cylinder. Telescoping members 47 are securely anchored to the bottom plate 22 of the control chamber. The telescoping members and the guide pipes 47 are illustrated in Figs. 11 and 12 as being three in number and arranged at 120° intervals around the main cylinder 1. Preferably, accordion tubes 48 of flexible material, such as soft leather, rubber material, or the like, are mounted to enclose the free space of the telescoping members 47 to prevent dust and dirt from entering between the telescoping members 47 and the guide pipes 46, to obviate excessive wear or undesirable friction.

Figure 13:
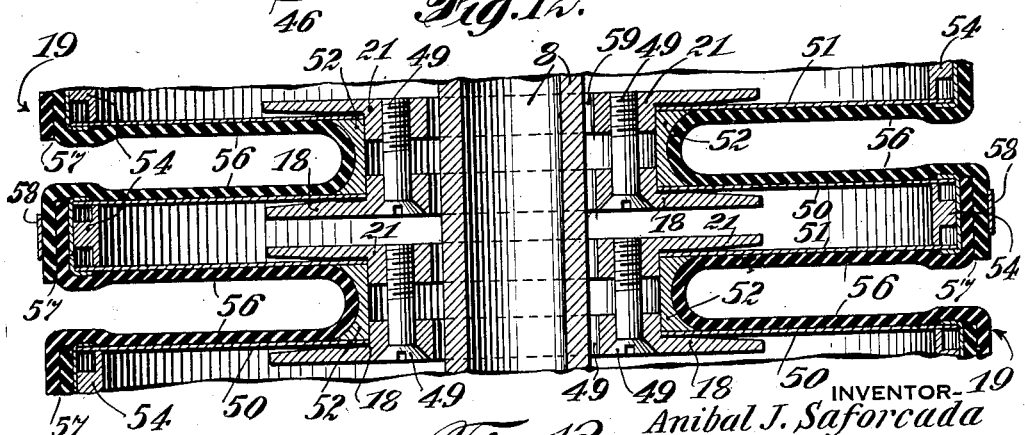
Fig. 13 is a detail view of a section of the sylphon member.

The sylphon bellows 19 being an important part of the present apparatus, is illustrated in detail in Fig. 13 and each member of this sylphon is made up of a bottom internal collar 18 and a top internal collar 21, which are clamped together by machine screws 49. Annular disks 50 and 51 of spring steel, of the character commonly used for handsaws, are mounted on the internal collars 18 and 21. These disks are held in place by annular grooved spacing members 52 which set against shoulders provided on the internal collars 18 and 21. When the machine screws 49 are tightened, the inner ends of the disks 50 and 51 are tightly clamped to form a hermetic seal against the spacing members 52 and the internal collars 18 and 21. The peripheries of the collars 18 and 21 are wedge-shaped to provide clearance for the operation of the disks 50 and 51 when the sylphon is flexed. Annular rings 54 are mounted between the peripheries of the annular disks 50 and 51 to provide internal spacing members. A flanged annular band encloses and hermetically seals the peripheries of each pair of the disks 50 and 51 and tightly clamps an annular ring 54 in position. A soft flexible rubber covering 56, of the type of rubber used commonly for inner tubes of tires for automobiles, encloses the entire sylphon from top to bottom, and forms a complete hermetically sealed covering for the entire sylphon. A convenient way of providing this rubber covering is to provide rubber units for each section of the sylphon, which rubber units are overlapped as at 57 and cemented together with rubber cement to form a hermetic joint within. To further insure the security of this joint a metal band 58 under tension is placed over each overlap 57. It will be observed that the rubber covering 56 is completely supported on metal parts so as to be capable of sustaining great pressure. An annular space 59 (Fig. 14) is provided between each sylphon unit and the hollow piston rod 8, in such manner, that atmosphere flowing around the hollow piston rod 8 through the opening in the top 6 may freely circulate throughout the interior of the sylphon. It will be noted, however, that the soft rubber covering 56 of the sylphon is hermetically sealed at 60 to the collar 16 carried by the piston and this soft rubber covering is likewise hermetically sealed to the top 6 at the point 61, so as to provide a sealed space comprising the combined space beneath the piston and around the sylphon.

A control member 62 comprises a hollow pipe extending into the hollow piston 8 with a reasonably tight fit. This control member is provided with a longitudinal slot 64 and is carried upon a head 65 which sits in a recess 66 in the base 4, which recess is slightly larger than head 65, so that this head may adjust itself in telescoping action of the parts. It will be noted that as the piston 9 descends it acts as a slide valve so that the slot 64 is gradually closed, and when the piston descends below the lower end of this slot 64 communication through the slot is cut off, and the air beneath the piston is trapped, except as to a flow around the piston into the space around the sylphon.

The fluid pressure members may be mounted for operation on a vehicle in various ways, whereby the operation of the fluid pressure members comprises a part of the suspension link between the axles etc., and the load carrying member or body of the vehicle, in other words the members replace the springs commonly used in automobiles. The preferred form of mounting of the device on an automobile will now be explained, and attention is directed more especially to Figs. 1 to 4. Fig. 1 comprises a front view of an automobile showing a pair of fluid pressure members suitably mounted for the purpose intended. The mountings on each side of the vehicle are substantially congruous, that is, they are identical except in reverse relation. Therefore, the same reference numerals will be used to designate corresponding parts on opposite parts of the vehicle.

The sub-base 5 of the pressure cylinder is secured to a bracket arm 67 mounted on the front sill 68, by means of stub bolts 69. A lever arm 70 is pivoted at 71 to the front sill 68, and is provided with an abutment 72 which rests against a pad of resilient rubber 74, supported by the under part of the bracket arm 67. A bifurcated arm 75 is mounted on a link 76, which is pivoted to the outer end of the lever arm 70. The arms 77 and 78 of the bifurcated arm 75, are pivoted at their outer ends to the suspension straps 42 and 44 of the fluid pressure suspension apparatus. The outer end of the bifurcated lever 75 is mounted upon a pivoted fulcrum 79 carried by a curved supporting post 80 anchored to the front axle 81, which carries the front road wheels 82. Stay links 84 are connected to the upper end of the supporting post 80 and at their lower ends to an anchor 85 bolted to the front axle 81 to support side thrust on the post 80. The supporting post 80 is so formed as to provide for clearance for a brake rod 86.

From the foregoing it will be observed that the weight of the body at the front end of the car, is sustained on the suspension straps 42 and 44 through the bracket lever 75, which bears downwardly on the pivoted fulcrum 79, and which pulls up on the outer end of the lever arm 70 through the link 76 and thus compresses the pad of resilient rubber 74 between the abutment 72 on the lever arm 70 and the bottom of the bracket arm 67. From the foregoing it will be observed that shocks tending to move the body of the automobile downward or the under-frame upward relative to the vehicle body, will cause added tension to the suspension straps 42 and 44, tending to telescope the operating parts of the air suspension member.

Referring now more especially to Figs. 5 to 10, inclusive, the preferred method of mounting of air suspension members at the back of the car will be explained. The mounting at the rear of the chassis like that of the front, comprises congruous members, that is, the various links and other connections are made as right and left hand pairs, so that for the purpose of simplification common reference numerals will be used to indicate corresponding parts of the same pair of operating parts.

A strong rigid bracket 87 is securely attached to the rear chassis frame 88, whereby the bracket extends outwardly from the back of the vehicle. The base of the air chamber is anchored to this bracket by stub bolts 89. A bifurcated lever 90 is pivoted at its inner end in a bearing 91 securely mounted on the rear axle 92. A heavy center frame member 94 is mounted at the rear central portion of the chassis and extends outwardly to the back of the vehicle. A cross bridge 95 is mounted on this center frame member. The ends of the cross bridge 95 are connected to the bifurcated levers 90 by couples 96 to communicate the vehicle load to the bifurcated levers 90. The arms 97 and 98 are respectively connected with the suspension straps 42 and 44 of the air suspension shock absorbing members, in such manner, that the load at the rear of the vehicle which is transmitted to the cross bridge 95 is sustained by tension of the suspension straps 42 and 44.

Figure 15:
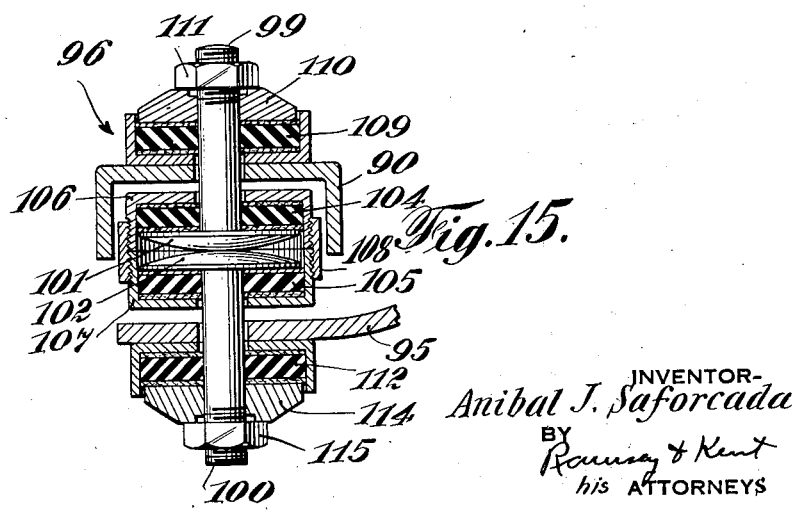
Fig. 15 is a view of a section through one of the coupling members on the ends of the bridge illustrated in Fig. 10.

The couple between the cross bridge 95 and the bifurcated levers 90, is illustrated in detail in Fig. 15, with the parts shown slightly separated in order to convey more clearly the load conditions prevailing in the couple. These couples comprise a pair of bolts 99 and 100 provided with spherical surfaced heads 101 and 102 to permit clearance. These spherical surfaced heads are supported by resilient rubber pads 104 and 105, which are enclosed by a housing formed of two parts 106 and 107, which are joined together by screw thread band 108. The bolt 99 extends upwardly through the bifurcated lever 90 and through a rubber pad 109, on which a pressure washer 110 bears due to the nut 111, resting against the same. The bolt 100 extends downwardly through the end of the cross bridge 95 and through a rubber pad 112, over which a pressure washer 114 distributes pressure transmitted through the nut 115. It will be observed that the weight of the car transmitted through the cross bridge 95 is sustained through the bolts 99 and 100 which are under tension and communicate the load through the lower rubber pad 112 and the upper rubber pad 109 to the bifurcated arm 90. This connection is flexible and resilient so that no heavy severe shocks are directly transmitted to the supporting parts. Furthermore, a sufficient clearance through the several parts is provided to permit a slight universal motion between the spherical surfaced heads 101 and 102. This connection facilitates the easy riding of the vehicle.

From the foregoing, it will appear that the air suspension shock absorber parts are so mounted as to sustain the sprung load of the vehicle which is carried upon a predetermined volume of compressed air, or other fluid, confined within the hermetically sealed conduits and chambers of the device. Any shock tending to move the body of the vehicle toward the axles or tending to move the axles toward the body of the vehicle, causes a telescoping movement between the piston and the side walls of the cylindrical chamber. This tends to super-compress the air beneath the piston. The super-compressed air escapes through the slotted control member to the hollow piston rod and raises the check valve, so that a part of the super-compressed air raises the pressure in the control chamber. Also a part of the super-compressed air escapes around the piston ring into the sylphon chamber, where pressure on the side walls of the sylphon members tends to collapse these members and pressure beneath the piston tends to lift the piston, so that if the shock is slight it is resisted before the piston closes the control slot in the control member. On a rebound from a slight shock, there is a tendency to further super-compress the air above the piston and rarify the air beneath the piston, so that the differential pressure on the rebound is greater above the piston than below at the moment the rebound occurs. This tends to check the rebound. Equilibrium is equally restored by air leaking past the piston ring and by air from the control chamber flowing through the bleeder opening and the control slot back into the chamber beneath the piston. In severe shocks the piston descends sufficiently to entirely close the control slot, thereby confining the air entirely to the space beneath the piston and a space around the sylphon. The resistance to the descending movement of the piston thereby is increased to such an extent as to prevent the piston from striking the bottom of the chamber.

From the foregoing, it will appear that the fluid pressure chamber members perform the double function of springs and shock absorbers, so that with the use of the present invention neither springs nor additional shock absorbers are required.

Having described my invention, I claim:

1. A device of the class described comprising a main chamber adapted to contain fluid under pressure, means operatively connected with the body of a vehicle and adapted to super-compress said fluid within a portion of said main chamber, a control chamber, a conduit leading from said main chamber to said control chamber, a slide valve to control the flow of liquid from said main chamber into said conduit, a control valve adapted to permit a flow of super-compressed fluid from said main chamber into said control chamber and to prevent rapid return of said super-compressed fluid to said main chamber.

2. In a device of the class described in combination with a main air chamber, air compression means mounted in said main air chamber and adapted to support the weight of a body of a vehicle when said main air chamber is supplied with air under compression, a control chamber, conduit means connecting said main air chamber with said control chamber, a slide valve to control the flow of compressed air from said main chamber into said conduit means, and a check valve for controlling the flow of compressed air from the said control chamber to said main air chamber.

3. A device of the class described comprising a main chamber adapted to contain fluid under pressure, piston means mounted for movement in said main chamber and being adapted to super-compress said fluid in a portion of said main chamber, a vehicle body operatively connected with said piston, a vehicle running-gear operatively connected with said main chamber whereby fluid under pressure in said main chamber acting on said piston is adapted to support the load of said vehicle body, a control chamber, a conduit leading from one side of said piston to said control chamber, valve means for controlling the inlet of the fluid to said conduit, the effective area of said valve means being controlled by the movement of said piston, a check valve in said conduit and adapted to permit said super-compressed fluid to flow from one side of said piston into said control chamber, and means to permit the gradual return of the super-compressed fluid from said control chamber to said main chamber.

4. A device of the class described comprising a main chamber adapted to sustain fluid under pressure, a piston mounted for movement in said main chamber, a hollow piston rod connected with said piston, a sylphon hermetically sealed to one side of said piston and to said main chamber, a passageway around said piston to permit a flow of compressed fluid from beneath said piston to the exterior of said sylphon, a slotted pipe extending into said hollow piston rod, the slot in said pipe terminating at such a distance from the end of said main chamber as to permit the telescoping movement of said piston rod to entirely close said slot before said piston reaches the end of said chamber.

5. In a device of the class described in combination a main air chamber, air compression means mounted in said main chamber, a control chamber, conduit means connecting said main air chamber with said control chamber, a valve controlling the inlet to said conduit means, the effective area of said valve being under control of said air compression means, and a check valve for preventing the flow of compressed air from the said control chamber to said main air chamber.

6. A device of the class described comprising a main chamber adapted to contain fluid under pressure, piston means operatively connected with the body of a vehicle and adapted to super-compress fluid within a portion of said main chamber, a control chamber, a conduit leading from said main chamber to said control chamber, a slide valve under control of said piston means to control the flow of fluid into said conduits, a check valve adapted to permit a flow of super-compressed fluid into said control chamber, and a small conduit to permit a slow return of said super-compressed fluid to said main chamber.

7. A device of the class described comprising a main chamber, piston means mounted for movement in said main chamber and out of contact with the side walls of said chamber to provide a narrow space around said piston, a vehicle body operatively connected with said piston, a vehicle running-gear operatively connected with said main chamber whereby fluid under pressure beneath the piston in said main chamber is adapted to support the load of said vehicle body, means to hermetically seal one side of said piston to said chamber, a control chamber, a conduit leading from the pressure side of said piston to said control chamber, a slotted valve member for controlling the inlet of the fluid to said conduit, the effective area of said valve means being controlled by the movement of said piston, a check valve adapted to permit super-compressed fluid to flow from one side of said piston into said control chamber, and a bleeder conduit to permit the gradual return of the super-compressed fluid from said control chamber to said main chamber.

8. In a device of the class described, the combination of a main chamber, a sylphon hermetically sealed to one end of said main chamber, a pipe connected at one end to said sylphon, a control chamber mounted on the other end of said pipe, a sliding valve telescoping into said pipe and being controlled by the telescoping movement of said pipe therewith, means to guide said pipe, and means operatively connecting said pipe and said main chamber between the running-gear and body of a vehicle.

9. In a device of the class described the combination of a main chamber, a sylphon within said main chamber and having one end of said sylphon hermetically sealed to one end of said main chamber, said sylphon comprising a plurality of spring disks anchored at their central portions in alternate pairs and at their outer portions in adjacent pairs whereby said sylphon comprises a spring member, a thrust member connected to the free end of said sylphon and attached to carry the load of a vehicle body, a control chamber, and conduit means operatively connecting said main chamber with said control chamber.

10. In a device of the class described, a mounting for the rear end of a vehicle, comprising bracket members secured to the body of the vehicle, fluid pressure means mounted upon said bracket members, a rear axle, lever arms pivoted to the rear axle of the vehicle and connected with said fluid pressure means, and flexible resilient connections between the body of the vehicle and said levers whereby the weight of the body of the vehicle is supported upon said levers.

11. In a device of the class described, the combination of a vehicle body; a vehicle running gear; and a shock absorber operatively connected between said vehicle body and said running-gear, said shock absorber comprising a pressure chamber and a sylphon mounted within said pressure chamber, said sylphon comprising a plurality of metallic spring discs, flanged collars, means to anchor the central portions of said discs to said collars, annular rings, means to anchor the outer portions of said discs to said annular rings, the central portions of said discs being anchored in alternate pairs to said collars, and the outer portions of said discs being anchored in adjacent pairs to said rings.

12. In a device of the class described, the combination of a vehicle body; a vehicle running-gear; and a shock absorber operatively connected between said vehicle body and said running-gear, said shock absorber comprising a pressure chamber and a sylphon mounted within said pressure chamber, said sylphon comprising a plurality of metallic spring discs, flanged collars, means to anchor the central portions of said discs to said collars, annular rings, means to anchor the outer portions of said discs to said annular rings, the central portions of said discs being anchored in alternate pairs to said collars, and the outer portions of said discs being anchored in adjacent pairs to said rings and a hermetic sealing envelope surrounding said sylphon.

13. A suspension for one side of the front end of a vehicle comprising compression means carried by the body of the vehicle, a pair of link members attached to said compression means, a lever member secured to said link members, a front axle, a standard mounted on said front axle, a pivotal connection between the upper end of said standard and said lever, and a fulcrum for said lever secured to said vehicle body.

14. In a device of the class described, a mounting for the rear end of a vehicle, comprising a chassis frame, bracket members secured to the rear portion of the chassis frame of the vehicle, a rear axle, lever arms having ends pivoted to said axle, resilient means between said brackets and the other ends of said lever arms resisting relative movement between the brackets and the ends of the lever arms, a cross bridge secured at its middle portion to the rear of the chassis frame, and flexible resilient connections between the outer ends of the crossbridge and said lever arms intermediate the ends of said arms whereby the weight of the body of the vehicle is borne by said lever arms.

ANIBAL J. SAFORCADA.